Sept. 7, 1954        J. GOEBEL        2,688,280
MULTIPLICATOR CAMERA
Filed June 27, 1951
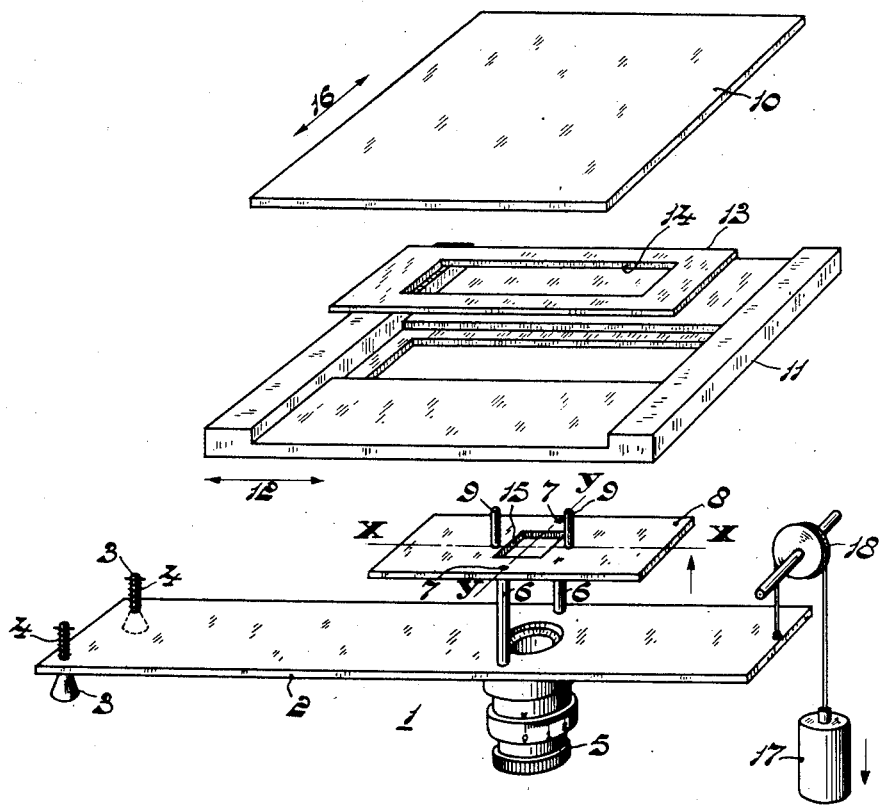
INVENTOR
JOSEPH GOEBEL
BY
AGENT Patented Sept. 7, 1954

2,688,280

UNITED STATES PATENT OFFICE 2,688,280

MULTIPLICATOR CAMERA

Joseph Goebel, The Hague, Netherlands, assignor to Nederlandse Document-reproductie N. V., The Hague, Netherlands Application June 27, 1951, Serial No. 233,911

5 Claims. (Cl. 95—37)

1

This invention is concerned with a photographic multiplicator camera, that is to say a camera with the use of which two or more exposures can be made on one negative.

It has been suggested to arrange a mask in such a camera at a given distance from the lens and to urge the negative against this mask. When such a device is required to be realised in practice it is found very difficult to satisfy the accuracy requirements of said cameras.

The object of the invention is inter alia to ensure this high accuracy in a very simple manner.

According to the invention, the mask is supported upon a pair of posts secured to the optical objective, and is thus adapted to rock on these posts whereas a further pair of posts on the mask can be urged against the negative, the two pairs of posts engaging the mask at points which are located pairwise on lines which are at right angles to one another and intersect each other at the center of the mask. As will be explained more fully hereinafter, this has the advantage that the lens of the camera has a constant adjustment in relation to that part of the negative which is at the center at the back of the mask.

In addition, the components which define the distance are particularly simple and it is also easily possible to render the mask exchangeable. For this purpose, according to a preferred embodiment, the mask is arranged loosely on the first pair of posts.

In order that the invention may be more clearly understood and readily carried into effect, it will now be described in detail with reference to the accompanying drawing, in which one embodiment is shown by way of example.

The single figure of the drawing is a perspective view of several components of a multiplicator camera.

The camera, of which only the parts most essential from the optical point of view are shown, comprises an optical objective 1 which is constituted by a supporting plate 2 which is pivotally supported on two studs 3 in contact with which the plate 2 is forced by helical springs 4. Arranged below the supporting plate is a frame 5 in which the lens is contained. Arranged on the supporting plate 2 are two posts 6 which at their upper ends are provided with trunnions 7. The trunnions are inserted through apertures in a mask 8. This mask is consequently adapted to rock within given limits about an axis or line y—y which unites the trunnions 7.

Arranged on the mask crosswise in relation to

2 these trunnions 7 are two posts 9 which, when the objective is raised, engage the negative 10. This negative and the parts which support it are shown separately. Negative 10 is in actual fact so much lower than the position shown that the posts 9 engage it. It is supported by a slide 11 which is adapted to move in the direction of the arrow 12. The slide contains a seat for a second mask 13 which comprises an elongated Window 14. This mask circumscribes the top and the bottom of the exposure to be made and the window 15 in the mask 8 defines the left-hand and right-hand sides thereof. It is thus possible to make many combinations with the use of a limited number of masks.

The negative 10 is adapted to slide over the slide 11 in the direction of the arrow 16, that is to say, in a direction at right angles to that in which the slide itself is adapted to move. This permits of coordinating the exposure in lines and columns on the negative.

As stated before, the device described has the advantage that the adjustment of the optical objective is constant in relation to the center of the exposure on the negative. This is due to the fact that the line $x$—$x$ which unites the lower ends of the posts 9 and the line $y$—$y$ on which the mask 8 is adapted to turn, that is to say the line which unites the trunnions 7, intersect one another at a point which is close below the said center. Hence, even if the negative is not located quite smoothly, as frequently occurs, particularly when use is made of films, the objective can nevertheless find the correct adjustment by turning on the line $y$—$y$, it being desirable that the length of the posts 9 should be small compared with the length of the posts 6. Firstly this is necessary to prevent the circumscribing of the exposure on the negative from being blurred and secondly, as a matter of fact it is desirable that the posts, which turn together with the mask, should not be of excessive length.

The objective may be urged in a number of ways, for example by spring pressure. In the construction shown it is effected by means of a weight 17 which with the use of a disc 18 compensates for the weight of the objective and is adapted to urge the posts 9 with light pressure against the negative.

What I claim is:

1. A multiplicator camera comprising an optical objective, a first pair of posts mounted on said optical objective, a mask mounted for limited pivotal movement on the ends of said first pair of posts located remote from said optical objective, a second pair of posts mounted on said mask, said first and second pairs of posts being parallel to each other and in alignment on lines perpendicular to each other, said mask pivoting on an axis of a line drawn through said ends of said first pair of posts, and said second pair of posts being adapted to be urged against a negative whereby said camera has a constant adjustment relative to that part of said negative exposed to said camera.

2. A multiplicator camera as defined in claim 1 wherein said mask is removably secured to said first pair of posts, and said negative moves in a plane transverse to the plane of said posts.

3. A multiplicator camera as defined in claim 1 wherein the distance between said first pair of posts is greater than the distance between said second pair of posts.

4. A multiplicator camera comprising an optical objective, a first pair of posts mounted on said optical objective, a mask provided with an aperture therein mounted for limited pivotal movement on the ends of said first pair of posts located remote from said optical objective, a second pair of posts mounted on said mask, said first and second pairs of posts being in alignment on lines perpendicular to each other, said alignment lines intersecting each other at a point approximately in the center of said aperture, said mask pivoting on an axis of a line drawn through said ends of said first pair of posts, and said second pair of posts being adapted to be urged against a negative whereby said camera has a constant adjustment relative to that part of said negative exposed to said camera through said aperture.

5. A multiplicator camera comprising a supporting plate, a lens unit mounted on said supporting plate, a first pair of posts mounted on said supporting plate, a mask mounted for limited pivotal movement on the ends of said first pair of posts located remote from said lens unit, a second pair of posts mounted on said mask, said first and second pairs of posts being parallel to each other and in alignment on lines perpendicular to each other, and said second pairs of posts being adapted to be urged against a negative whereby said camera has a constant adjustment relative to that part of said negative exposed to said camera.

References Cited in the file of this patent

UNITED STATES PATENTS

| Number | Name | Date |
|---|---|---|
| 2,335,697 | Reyniers | Nov. 30, 1943 |